United States Patent [19]
Thorpe et al.

[11] 4,038,683
[45] July 26, 1977

[54] TELEVISION SYNCHRONIZING GENERATOR

[75] Inventors: Laurence Joseph Thorpe, Marlton; Burnard Eugene Nicholson, Haddonfield, both of N.J.

[73] Assignee: RCA Corporation, New York, N.Y.

[21] Appl. No.: 642,731

[22] Filed: Dec. 22, 1975

[30] Foreign Application Priority Data

Apr. 4, 1975 United Kingdom ............... 13949/75
Apr. 4, 1975 United Kingdom ............... 13948/75

[51] Int. Cl.² ............................................. H04N 9/46
[52] U.S. Cl. ................................................. 358/19
[58] Field of Search ............................. 358/17, 19; 178/69.5 CB

[56] References Cited

U.S. PATENT DOCUMENTS

| | | |
|---|---|---|
| 2,793,347 | 5/1957 | Clark .............................. 358/19 X |
| 3,225,134 | 12/1965 | Jensen ............................ 358/19 X |
| 3,493,680 | 2/1970 | Brown ............................ 358/19 X |
| 3,549,793 | 12/1970 | Ross ................................. 358/19 |
| 3,571,513 | 3/1971 | Ward et al. ............. 178/69.5 CB |
| 3,637,936 | 1/1972 | Krause ............................ 358/19 X |

Primary Examiner—Robert L. Richardson
Assistant Examiner—Aristotelis M. Psitos
Attorney, Agent, or Firm—Eugene M. Whitacre; Mason DeCamillis

[57] ABSTRACT

A synchronizing generator is provided for synchronizing the composite video signal output of a television camera to an external television system reference represented by a source of reference signal including line and color reference signal components which are subject to variations in relative time and phasing. First and second phase-lock loops maintain independent synchronism of the line and color signal components of the composite video output to the line and color signal components of the source of reference signal.

3 Claims, 4 Drawing Figures

TELEVISION SYNCHRONIZING GENERATOR

BACKGROUND OF THE INVENTION

This invention relates to television synchronizing generator apparatus and especially to apparatus for synchronizing the television signals from two or more sources of video information, for example, two or more television cameras.

In the programming of television programs, many of the video information sources comprise television cameras which electronically scan the scene information for conversion to an electrical signal representative of the scene. It is necessary that the electrical signal representing the scene information be identified by timing signals in order that the image information may be processed, transmitted and reassembled in the same sequence as the original scanning. This timing process is generally known as synchronizing, and comprises the precision timing of the electronic scanning of the original image. Historically, the synchronizing of television signals from one or more cameras has been accomplished by means of a device known as a master synchronizing generator. In master sync systems, timing information in the form of horizontal and vertical scan timing signals, as well as blanking and color subcarrier signals, are coupled from the master sync generator to the various cameras by means of multiple conductor or coaxial cable. Television systems of the above-described form, although satisfactory for single studio use, become cumbersome when employed in multiple studio or field and portable camera use. To provide added flexibility, individual synchronizing generators have been developed which are located at all picture sources. These individual synchronizing generators, being located at the primary source of video information, are generally identified as source sync generators and the cameras being capable of stand-alone operation. However, it is still necessary, when utilizing individual source synchronizing generators, to provide a means of insuring that the timing of all of the video sources be phase coincident for efficient programming of the final television picture. To insure this phase coincidence, it is common to provide a single master reference signal in the form of an external composite signal reference to which all the video sources, such as television cameras, are locked by a process well known as Genlock. However, the use of Genlock does not insure continuous phase coincidence with the incoming reference video signal, especially in the case of source sync generators for color television signals, wherein the relative phasing of the horizontal sync pulse and the color subcarrier (burst) of the reference signal are varying.

SUMMARY OF THE INVENTION

In accordance with the invention, a synchronizing generator having first and second phase-lock control loops is provided for synchronizing the composite video signal output of a television camera to an external television system reference represented by a source of reference signal having at least line and color reference signal components, the line and color reference signal components being subject to variations in relative time and phase. The first phase-lock loop includes a sync generating circuit for producing a plurality of synchronizing signals other than color subcarrier, a first source of clock signals coupled to an input of the sync generating circuit and a first phase detector. The first phase detector is coupled to a line rate output of the sync generating circuit and the external line reference signal component for producing a first control voltage. The first control voltage is coupled to the first clock signal source for synchronizing the plurality of synchronizing signals to the line signal component of the external reference. The synchronized plurality of signals are coupled to utilization means in the camera for providing the composite video waveform. The second phase-lock loop includes a second source of clock signals for producing the color subcarrier, and a second phase detector. The second phase detector is coupled to the second clock source and to the external color reference signal component for producing a second control voltage. The second control voltage is coupled to the second clock source for synchronizing the color subcarrier to the color reference signal component of the external reference. The synchronized color subcarrier is coupled to utilization means in the camera for providing the color component of the composite video waveform. The first and second phase-lock loops provide independent synchronism of the line and color signal components of the composite video output signal to the line and color signal components of the source of reference signal.

The above features and advantages of the present invention will become apparent with reference to the following detailed description taken in conjunction with the accompanying drawings in which.

Figure 1:
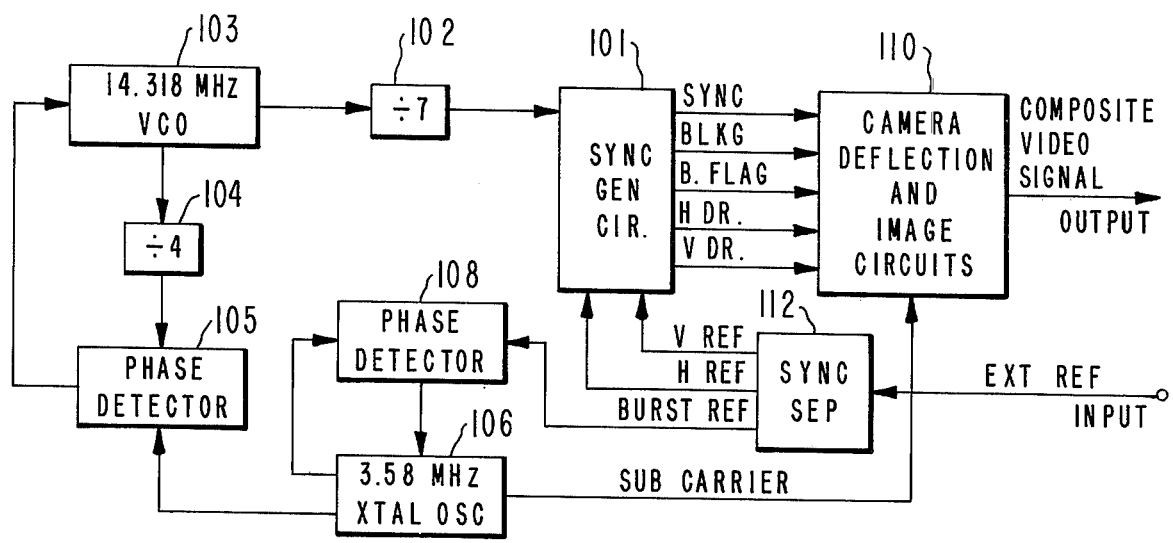
FIG. 1 is a block diagram of a conventional source sync generator.

In FIG. 1, a voltage controlled oscillator (VCO) operating at a center frequency of 14.318 Megahertz (MHz) has its output terminal coupled to the input terminal of a divide-by-seven circuit 102. The output terminal of divider 102 is coupled to the input clock terminal of sync generator circuit 101 of a known type, thus providing the basic clock frequency of 2.0454 Megahertz for sync generator 101. The sync generator circuit 101, which is in integrated form, produces the required television timing signals in the form of composite sync, composite blanking, burst flag, horizontal drive and vertical drive, for proper operation of the camera deflection and image generating circuit 110. Insofar as described, oscillator 103, divider 102 and sync generator circuit 101 constitute the required basic timing signals for a monochrome television signal. In order to provide the capability of color timing signals, the source sync generator of FIG. 1 also includes a crystal oscillator 106 whose operating frequency of 3.58 Megahertz equals the subcarrier frequency, thus providing at its output terminal the required subcarrier signal which is in turn coupled to camera circuit 110. A second output terminal of oscillator 106 is coupled to one input terminal of phase detector 105 to provide thereat a reference frequency of 3.58 Megahertz. A second output terminal of VCO 103 is coupled to the input terminal of a divide-by-four circuit 104 to provide a nominal 3.58 Megahertz signal at a second input terminal of phase detector 105. Phase detector 105 compares the 3.58 Megahertz signal from oscillator 106 with the 3.58 Megahertz signal from VCO 103 and generates a D.C. control voltage as its output signal. The output of phase detector 105 is coupled to the control terminal of VCO 103, thereby closing the "loop". This circuit loop is commonly referred to as a phase-lock loop and will hold over its operating range the output of VCO 103 and, in turn, the clocked output of sync generator circuit 101 fixed to the color subcarrier signal from oscillator 106. When Genlock operation is desired, a composite video signal is separated by a sync separator circuit 112 of known form into its horizontal (H ref.), vertical (V. ref.) and color (burst ref.) components. The H ref. and V ref. signals are coupled to the H and V reset terminals, respectively, of sync generator circuit 101, wherein they are utilized to reset the H and V count-down dividers of sync generator 101. The color reference at 3.58 Megahertz (burst) portion of the opposite video signal is coupled to one terminal of phase detector 108, where it is compared with the output of oscillator 106, which is also at 3.58 Megahertz. As in the case of phase detector 105, a comparison is made and a D.C. control voltage adjusts oscillator 106 to be coincident with the external color reference. Any adjustment of oscillator 106 is, in turn, reflected in phase detector 105 which, in turn, corrects VCO 103 so that the phase relationship of the sync timing signals of sync generating circuit 101 remains fixed with the subcarrier.

The operation of FIG. 1, however, exhibits a serious operating problem to which the present invention is directed. As described in conjunction with FIG. 1, the 14.318 VCO 103 is phase-locked to the incoming color reference under Genlock conditions; therefore, the 2.0454 Megahertz input clock signal to sync generator circuit 101 is also locked to the incoming color reference. Simultaneously, the H ref. and V ref. of the incoming reference is resetting sync generator circuit 101. The Genlock signal, thus applied, will maintain synchronism of the source sync generator only under the provision that the horizontal sync and burst of the incoming reference signal remain in a fixed relationship. If the relative phase of the horizontal sync and burst changes, then the output of the source sync generator can be ambiguous. In a typical situation, the incoming color reference burst may be slipping progressively with respect to the incoming horizontal reference, thus periodically, depending on the rate and magnitude of slippage, the output sync will jump instantaneously in phase due to the independent resetting of the horizontal count-down dividers of sync generating circuit 101 by the H ref. Such sync output phase changes makes it literally impossible to maintain an efficient programming mix of the television signals. Since there is no present specification on the time and phase position of the color burst signal with respect to the leading edge of horizontal sync, it is impracticable to depend solely on the conventional Genlock features illustrated in FIG. 1.

Figure 2:
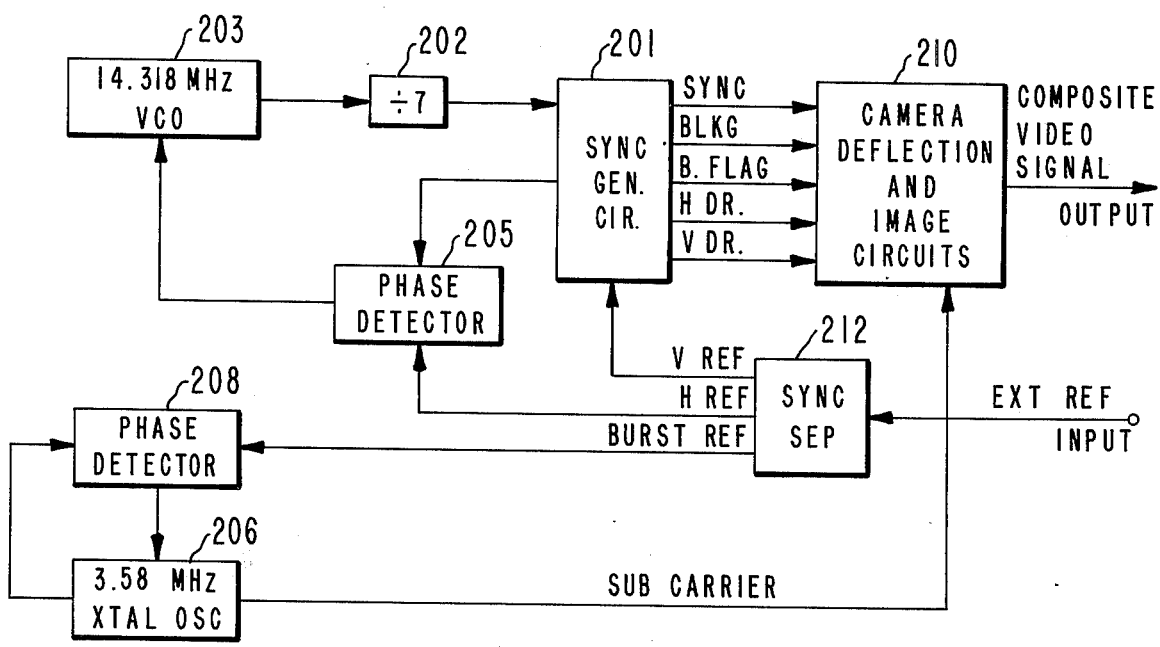
FIG. 2 is a block diagram of a source sync generator embodying the present invention.

The circuit arrangement of FIG. 2, illustrated in block diagram form, provides an efficient solution to the operational difficulties described in connection with FIG. 1. In FIG. 2, a first phase-lock loop comprises VCO 203, divider 201, sync generator circuit 201 and phase detector 205. Under Genlock conditions, the external H ref. is coupled to one input of phase detector 205. The other input of phase detector 205 is coupled to an H related signal, typically the one-half horizontal frequency signal H/2 generated by sync generator circuit 201. Phase detector 205 compares the external H ref. signal with the H related signal from sync generator 201 and generates a D.C. control voltage which is, in turn, coupled back to the control terminal of VCO 203. The horizontal sync output of sync generator 201 is now independently locked to the external H ref. signal by virtue of the VCO control of the 2.0454 Megahertz clock input to sync generator circuit 201 rather than by resetting of sync generator circuit 201, as described in connection with FIG. 1.

A second phase-lock loop is utilized in the circuit configuration of FIG. 2 for the corresponding Genlock control of the color subcarrier generation. The external color reference (burst) is coupled to one input terminal of phase detector 208. The other input terminal of phase detector 208 is coupled to an output of oscillator 206. Phase detector 208 compares the external color reference (burst) frequency of 3.58 Megahertz with the output frequency of 3.58 Megahertz from oscillator 206 and generates a D.C. control voltage which is, in turn, coupled to the control terminal of oscillator 206, thereby insuring that the generated subcarrier is locked in frequency and phase to the external color reference (burst).

The use of two independent phase-lock loops, one for color lock and the other for horizontal lock, places the source sync generator horizontal and subcarrier outputs under individual control of the incoming reference signals, thus maintaining the master timing dictated by the reference signals as well as providing for independent adjustment of either or both horizontal and color subcarrier generated signals for flexibility in timing and phasing of video signals from multiple sources when it is desired to mix one or more such video sources for programming purposes.

Figure 3:
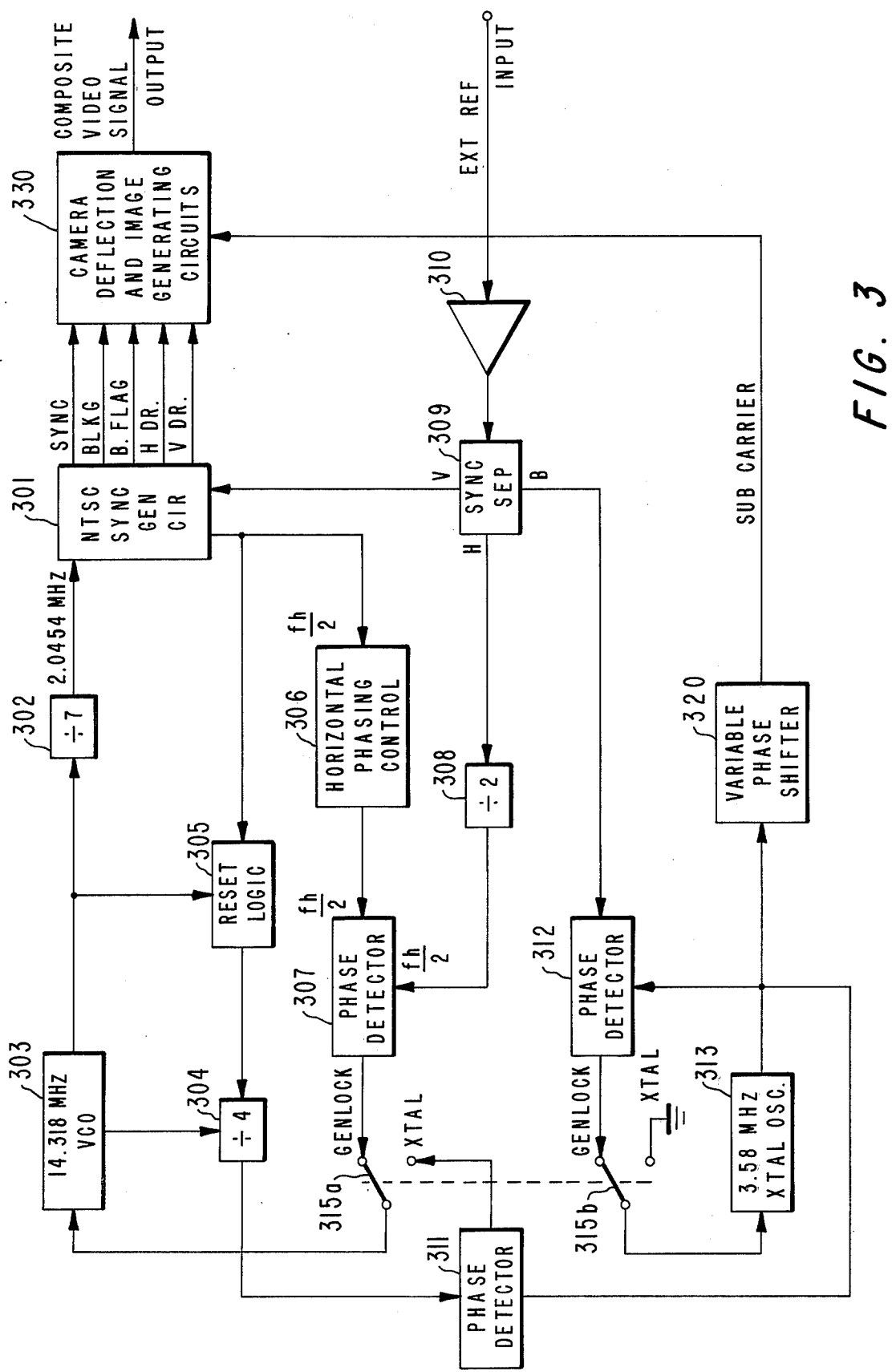
FIG. 3 is a block diagram of an NTSC source sync generator illustrating a preferred embodiment of the invention.
Figure 4:
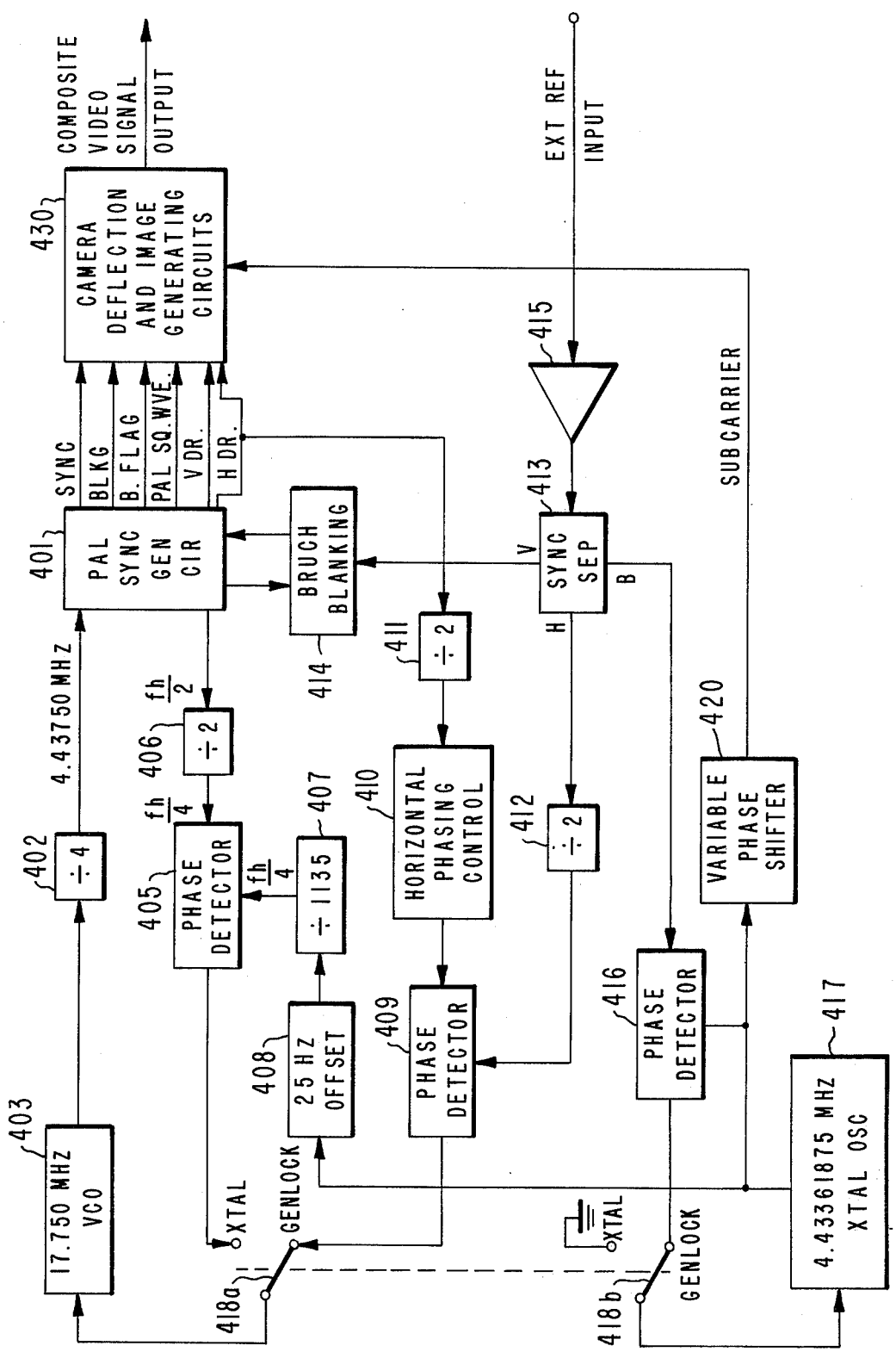
FIG. 4 is a block diagram of a PAL source sync generator illustrating a preferred embodiment of the invention.

FIG. 3 illustrates the use of the invention in a NTSC source sync generator, which provides for stand-alone (XTAL) and Genlock operation with the further provision of independent adjustment of horizontal and color phasing to allow intermixing of the composite video output signal from the source sync generator with any other composite video output signal.

In the Genlock mode of operation, illustrated in FIG. 3, an external reference video signal in the form of a composite video signal is coupled to an input terminal of amplifier 310. The output terminal of amplifier 310 is, in turn, coupled to the input of sync separator 309. Sync separator 309, operating in a manner well known to those skilled in the art, provides output signals in the form of vertical ref. V, horizontal ref. H and color ref. B. As previously described in connection with the apparatus of FIGS. 1 and 2, these reference signals serve to lock the source sync generator to the external reference signal.

The horizontal phase-lock loop of FIG. 3 comprises VCO 303, divider 302, sync generator circuit 301 and phase detector 307, which serves to maintain the output timing signals of sync generator circuit 301 locked to the H ref. portion of the external video reference.

The subcarrier phase-lock loop of FIG. 3 comprises oscillator 313 and phase detector 312 which maintain the 3.58 Megahertz subcarrier output locked to the B ref. portion of the external video reference.

As was previously described in connection with the apparatus of FIG. 2, the horizontal and subcarrier phase-lock loops are independent and will maintain the output of the source sync generator locked to the incoming reference video. In order to utilize the maximum flexibility that the two independent phase-lock loops afford, the horizontal phase-lock loop further